(12) United States Patent
Yuan

(10) Patent No.: US 11,620,784 B2
(45) Date of Patent: *Apr. 4, 2023

(54) VIRTUAL SCENE DISPLAY METHOD AND APPARATUS, AND STORAGE MEDIUM

(71) Applicant: Tencent Technology (Shenzhen) Company Limited, Shenzhen (CN)

(72) Inventor: Jiaping Yuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/727,636

(22) Filed: Apr. 22, 2022

(65) Prior Publication Data

US 2022/0245881 A1 Aug. 4, 2022

Related U.S. Application Data

(63) Continuation of application No. 16/551,498, filed on Aug. 26, 2019, now Pat. No. 11,341,706, which is a
(Continued)

(30) Foreign Application Priority Data

Aug. 31, 2017 (CN) .......................... 201710770774.6

(51) Int. Cl.
*G06T 13/80* (2011.01)
*A63F 13/525* (2014.01)

(52) U.S. Cl.
CPC ............ *G06T 13/80* (2013.01); *A63F 13/525* (2014.09); *A63F 2300/6661* (2013.01)

(58) Field of Classification Search
None
See application file for complete search history.

(56) References Cited

U.S. PATENT DOCUMENTS 6,040,841 A 3/2000 Cohen et al.
7,299,417 B1* 11/2007 Barris ................ H04N 21/4314
715/765
(Continued)

FOREIGN PATENT DOCUMENTS

CN 1418010 A 5/2003
CN 101005609 A 7/2007
(Continued)

OTHER PUBLICATIONS

Tencent Technology, ISRWO, PCT/CN2018/101451, dated Nov. 5, 2018, 5 pgs.
(Continued)

*Primary Examiner* — Yanna Wu
(74) *Attorney, Agent, or Firm* — Morgan, Lewis & Bockius LLP

(57) ABSTRACT

Embodiments of this application provide a virtual scene display method performed at a computing device. The method includes: obtaining animation data and video data; displaying an animation interface corresponding to the animation data in an animation display area of a display interface, the animation interface including a first virtual scene including a plurality of animation elements; and playing a video clip in the video data in response to an operation on the animation elements in the animation interface, the video clip presenting a picture of transformation from the first virtual scene to a second virtual scene. A virtual scene display solution provided in the embodiments of this application can reduce resource consumption of an intelligent device and reduce picture stutter.

12 Claims, 10 Drawing Sheets

Related U.S. Application Data continuation of application No. PCT/CN2018/101451, filed on Aug. 21, 2018.

(56) References Cited

U.S. PATENT DOCUMENTS

| | | |
|---|---|---|
| 2002/0149590 A1 | 10/2002 | Townsend |
| 2005/0075166 A1 | 4/2005 | Hemstreet et al. |
| 2010/0293190 A1* | 11/2010 | Kaiser ................ H04N 21/854 707/769 |
| 2012/0001925 A1 | 1/2012 | Andonieh et al. |
| 2014/0336796 A1 | 11/2014 | Agnew |

FOREIGN PATENT DOCUMENTS

| | | |
|---|---|---|
| CN | 101465957 A | 6/2009 |
| CN | 101689278 A | 3/2010 |
| CN | 101908232 A | 12/2010 |
| CN | 102508662 A | 6/2012 |
| CN | 105069827 A | 11/2015 |
| JP | H 11137849 A | 5/1999 |
| JP | 2010231281 A | 10/2010 |

OTHER PUBLICATIONS

Tencent Technology, IPRP, PCT/CN2018/101451, dated Mar. 3, 2020, 4 pgs.

\* cited by examiner

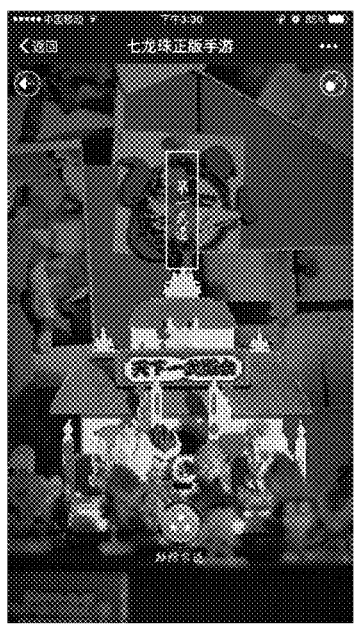  
FIG. 7-1    FIG. 7-2    FIG. 7-3

VIRTUAL SCENE DISPLAY METHOD AND APPARATUS, AND STORAGE MEDIUM

CROSS-REFERENCE TO RELATED APPLICATIONS

The application is a continuation application of U.S. application Ser. No. 16/551,498, entitled "VIRTUAL SCENE DISPLAY METHOD AND APPARATUS, AND STORAGE MEDIUM" filed on Aug. 26, 2019, which is a continuation application of PCT/CN2018/101451, entitled "VIRTUAL SCENE DISPLAY METHOD AND APPARATUS, AND STORAGE MEDIUM" filed on Aug. 21, 2018, which claims priority to China Patent Application No. 201710770774.6, filed with National Intellectual Property Administration, PRC on Aug. 31, 2017 and entitled "VIRTUAL SCENE DISPLAY METHOD AND APPARATUS, AND STORAGE MEDIUM", all of which are incorporated herein by reference in their entirety.

FIELD OF THE TECHNOLOGY

This application relates to the field of Internet technologies, and in particular, to a virtual scene display method and apparatus, and a storage medium.

BACKGROUND OF THE DISCLOSURE

In a page or an application having an animation display requirement, a plurality of independent scenes is usually included. One scene may be defined as a plurality of pictures including a continuous event or a plurality of pictures of one group of continuous actions. During switching from one scene to a next scene, in an existing solution, locations of a plurality of material components of a plurality of layers are controlled, through a program script, to change at the same time, to simulate lens movement and implement scene switching.

SUMMARY

To resolve a problem in the existing technology that simulation of lens movement of a virtual scene affects intelligent device performance and easily causes picture stutter, embodiments of this application provide a virtual scene switching method.

According to a first aspect of the present application, an embodiment of this application provides a virtual scene display method applied to a computing device having one or more processors and memory storing programs to be executed by the one or more processors and the method comprising:

obtaining animation data and video data;

displaying an animation interface corresponding to the animation data in an animation display area of a display interface, the animation interface including a first virtual scene including a plurality of animation elements; and playing a video clip in the video data in response to an operation on the animation elements in the animation interface, the video clip presenting a picture of transformation from the first virtual scene to a second virtual scene.

According to a second aspect of the present application, an embodiment of this application provides a computing device comprising one or more processors, memory coupled to the one or more processors and a plurality of programs stored in the memory that, when executed by the one or more processors, cause the computing device to perform the aforementioned virtual scene display method.

According to a third aspect of the present application, an embodiment of this application provides a non-transitory computer readable storage medium storing a plurality of machine readable instructions in connection with a computing device having one or more processors. The plurality of machine readable instructions, when executed by the one or more processors, cause the computing device to perform the aforementioned virtual scene display method in the embodiments.

In the embodiments of this application, a virtual scene and a virtual scene switching picture are produced into a video, and the video clip is played during animation presentation, to achieve simulate lens movement, reduce consumption of processing resources of a terminal device, avoid picture stutter, and facilitate production and modification of fine arts, so that a fine art personnel produces a high-quality animation effect without considering impact of an animation on mobile phone performance.

BRIEF DESCRIPTION OF THE DRAWINGS

FIG. 2 is a schematic diagram of a system according to an embodiment of this application.

FIG. 7-1 to FIG. 7-3 are schematic diagram of a switching effect interface for simulating lens movement by using the existing technology.

DESCRIPTION OF EMBODIMENTS

Figure 1:
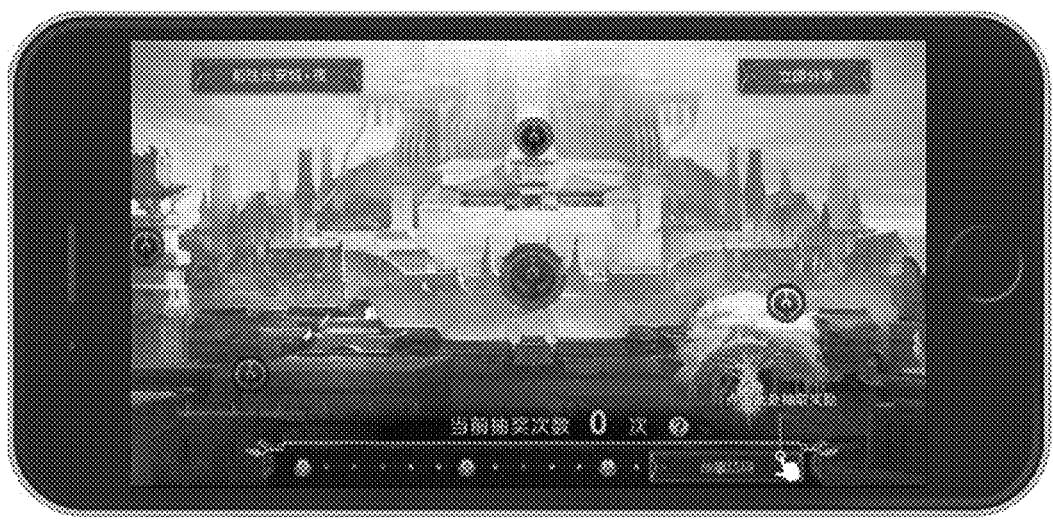
FIG. 1-1 to FIG. 1-2 are schematic diagrams of a scene switching effect interface for simulating lens movement.
Figures 1, 2:
Figure 2:
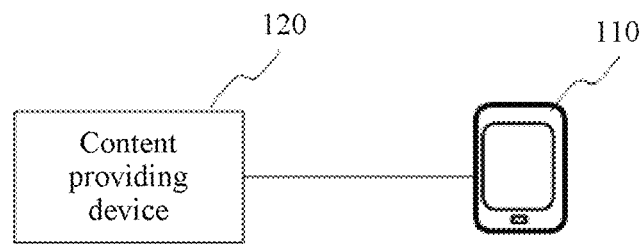

FIG. 1-1 to FIG. 1-2 are schematic diagrams of a scene switching effect interface for simulating lens movement. A switching picture of scenes when a lens moves to the right is simulated in FIG. 1-1 and FIG. 1-2. When locations of a plurality of material components of a plurality of layers are controlled, through a program script, to change at the same time, it requires consumption of a large quantity of processing resources of a terminal and easily causes picture stutter.

To improve processing efficiency and picture smoothness of scene switching, in this embodiment of this application, animation display content is divided into a plurality of parts. A scene switching part is implemented by a video, and other parts are still implemented by an animation. FIG. 2 is a schematic diagram of a system according to an embodiment of this application. The system may include a terminal device 110 and at least one content providing device 120.

The content providing device 120 is a device for providing presented content to the terminal device 110. The presented content may include a web page with an animation display effect, web content, game content in a game APP, and the like. The content providing device 120 may be a website, a web page game server, an online game server, and the like.

The terminal device 110 may be an electronic device that obtains and presents content through a network. The terminal device 110 may include, but not limited to, a mobile phone, a tablet computer, a notebook computer, a PC, a set top box, and the like. The terminal device 110 may obtain the presented content from the content providing device 120 by running an application program and present the presented content in a display device. The display device may be a screen, a display, a television, a projector, and the like of the terminal device 110. The application program in the terminal device 110 that is used for obtaining and presenting content may include, but not limited to, a browser, a game software APP, and other various APPs. For example, a game software APP is installed in the terminal device 110. After the user triggers running the game software APP 120, the stored game software APP 120 may be called to perform the virtual scene display method in various embodiments.

Figure 3:
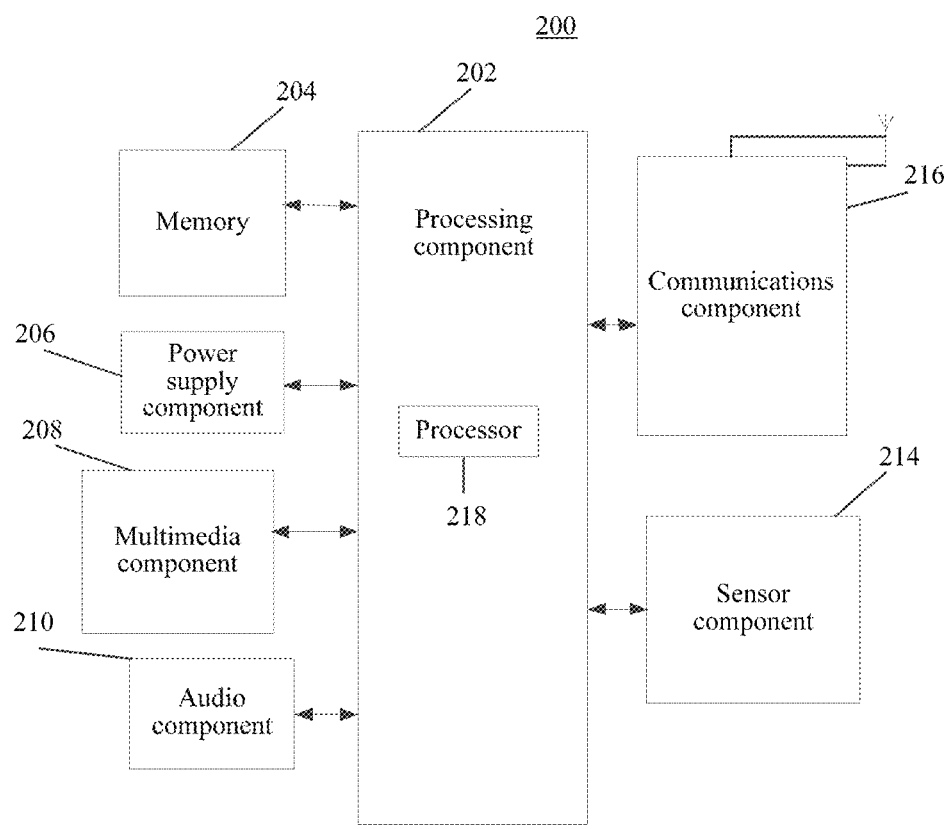
FIG. 3 is a block diagram of an apparatus according to an embodiment of this application.

FIG. 3 is a block diagram of an apparatus 200 according to an embodiment of this application. For example, the apparatus 200 may be the terminal device 110 in FIG. 2. The terminal device may be a mobile terminal, such as a smartphone and a tablet computer, or may be a non-portable terminal device such as a PC and a set top box.

Referring to FIG. 3, the apparatus 200 may include one or more of the following components: a processing component 202, a memory 204, a power supply component 206, a multimedia component 208, an audio component 210, a sensor component 214, and a communications component 216.

The processing component 202 controls whole operations of the apparatus 200 and may include one or more processors 218 to execute instructions, to complete all or some steps of the methods.

The memory 204 stores various types of data, including an instruction of the application program or method in the apparatus 200. The memory 204 may be implemented by using a volatile or non-volatile storage device of any type or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a disk, or an optical disc.

In an exemplary embodiment, the apparatus 200 may be implemented by using one or more application-specific integrated circuits (ASIC), a digital signal processor, digital signal processing device, a programmable logic device, a field programmable gate array, a controller, a micro controller, a microprocessor, or another electronic element, and is configured to perform the methods in the embodiments.

Figure 4A:
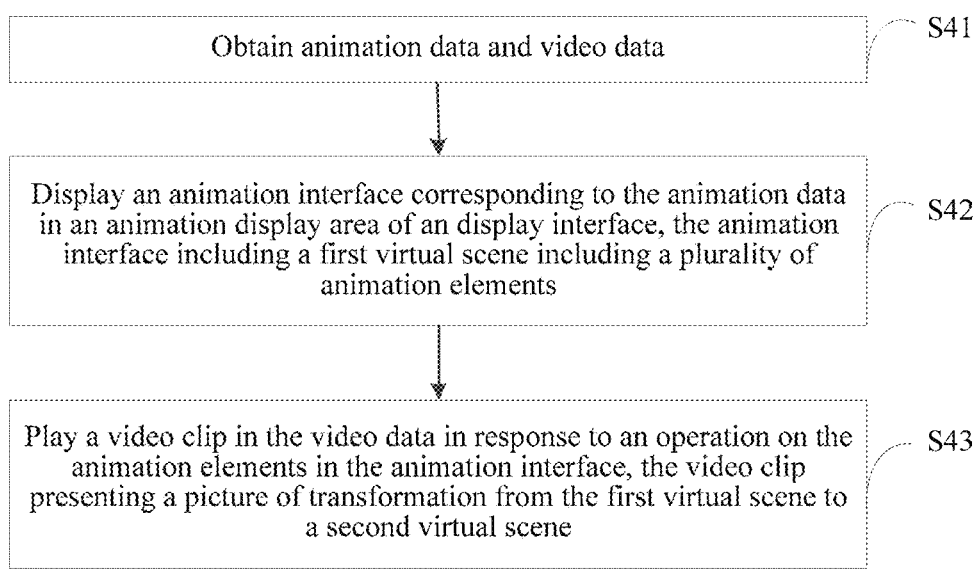
FIG. 4A and FIG. 4B are flowcharts of a virtual scene display method according to an embodiment of this application.

FIG. 4A is a flowchart of a virtual scene display method according to an embodiment of this application. As shown in FIG. 4A, the method includes the following steps.

Step S41: Obtain animation data and video data.

The animation data is data used for rendering an animation effect and may include data used for describing an animation element and a motion logic. The animation data may be generated by using an animation edition tool (such as Flash).

Step S42: Display an animation interface corresponding to the animation data in an animation display area of a display interface, the animation interface including a first virtual scene including a plurality of animation elements.

S43: Play a video clip in the video data in response to an operation on the animation elements in the animation interface, the video clip presenting a picture of transformation from the first virtual scene to a second virtual scene.

In this embodiment, virtual scene switching is performed in the animation interface by playing a video clip, rather than moving the animation elements through an animation logic, greatly reducing processing resources required by scene switching, so that a picture is smoother.

In some embodiments, the video data may include data of one or more video clips. When a video clip in the video data is played, a preset video clip location corresponding to the enter instruction may be obtained, and the video clip corresponding to the video clip location in the video data is played. The video clip location may include an initial location of the video clip in the video data. The location may be a time location or a frame location. Corresponding video data and a location of the video clip in the video data may be preset for an operation for triggering scene switching. In this way, when the operation is detected, a location of a video clip corresponding to the operation may be determined according to preset information.

For example, the video clip location may include a start time of the video clip in the video data. When the video clip is played, a time attribute of a video element in the display interface may be configured as the start time, so that the video element plays a video clip corresponding to a location of the start time in the video data. For example, the animation display area may be provided by a Canvas element of HTML5. The video element may be a Video element of HTML5. When the video needs to be played to switch a virtual scene in an animation, a CurrentTime attribute of a Video element in the display interface may be set as a start time of a to-be-played video clip, so that the Video element starts to play the video clip from the start time in the video data, switching the virtual scene.

In some embodiments, when the video data includes a plurality of video clips, different video clips in the video data may be played to meet different requirements in animation presentation. For example, after the scene is switched, interaction with a user may also be implemented by combining the video clip and an interactive element. For example, a second video clip corresponding to the second virtual scene in the video data may be played, and an interactive element is displayed in a display area of the second video clip in a superimposing manner. A third video clip corresponding to the interactive display element in the video data is played in response to an operation on the interactive element. In this way, dependency on the animation data can be further reduced, to reduce consumption of processing resources of the terminal. When the operation of the user is not detected, the second video clip may also be repeatedly played to wait for the user to issue an operation instruction. That is, the second video clip is played again, and the interactive element is displayed in a superimposing manner when playing of the second video clip is completed in response to that it is determined that the operation is not detected.

Figure 4B:
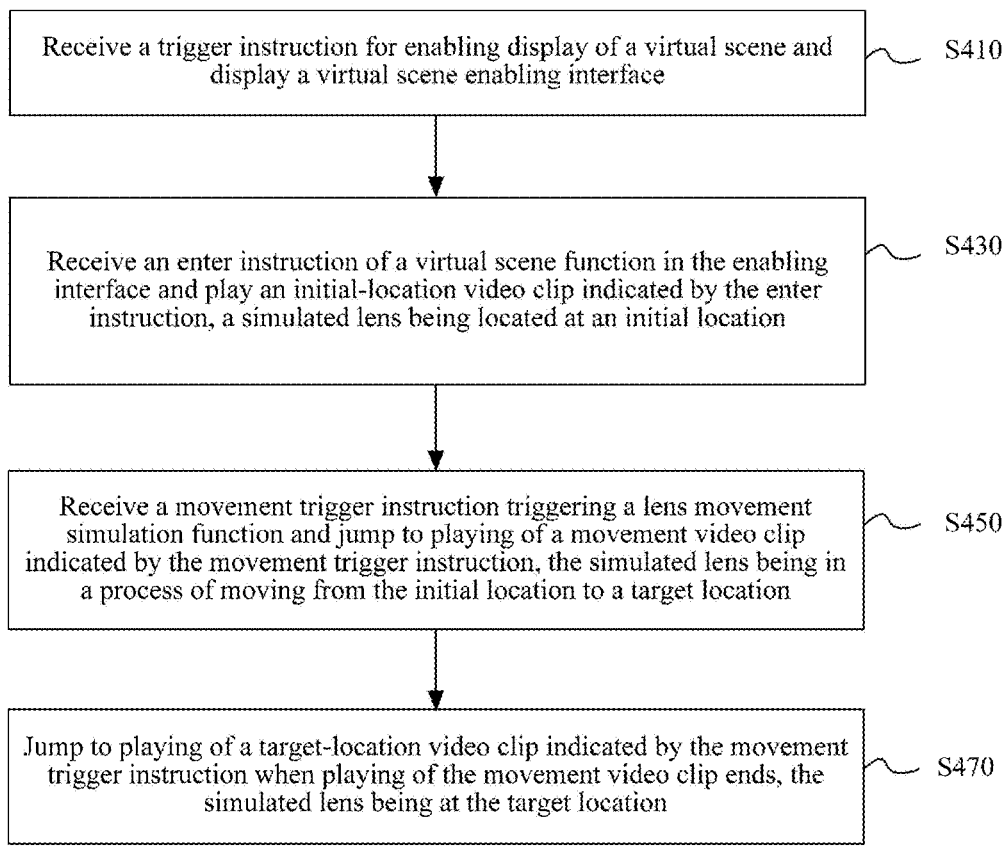

FIG. 4B is a flowchart of a virtual scene display method according to an embodiment of this application. An applicable range and an execution body of the virtual scene display method for simulating lens movement may be, for example, that the method is used in the terminal device 110 in the implementation environment shown in FIG. 2. As shown in FIG. 4B, the virtual scene display method for simulating lens movement may be performed by the terminal device 110 and may include the following steps.

Step S410: Receive a trigger instruction for enabling display of a virtual scene and display a virtual scene enabling interface.

The virtual scene in this embodiment of this application includes a user interface part and a video part that are implemented by an animation. After receiving the trigger instruction for triggering, by the user, enabling display of the virtual scene, the terminal device 110 runs a game software APP and displays a virtual scene enabling interface shown in FIG. 5. The enabling interface may use an animation edition tool such as Flash software to generate an animation effect and a logic information file. A control for entering a virtual scene function may be created, and is displayed in the enabling interface, and for example, may be a key "enter a lab" shown in FIG. 5.

Step S430: Receive an enter instruction of a virtual scene function in the enabling interface and play an initial-location video clip indicated by the enter instruction, a simulated lens being located at an initial location. That is, the displayed picture is a picture of transformation from the virtual scene of the enabling interface to the virtual scene corresponding to the initial location.

Figure 5:
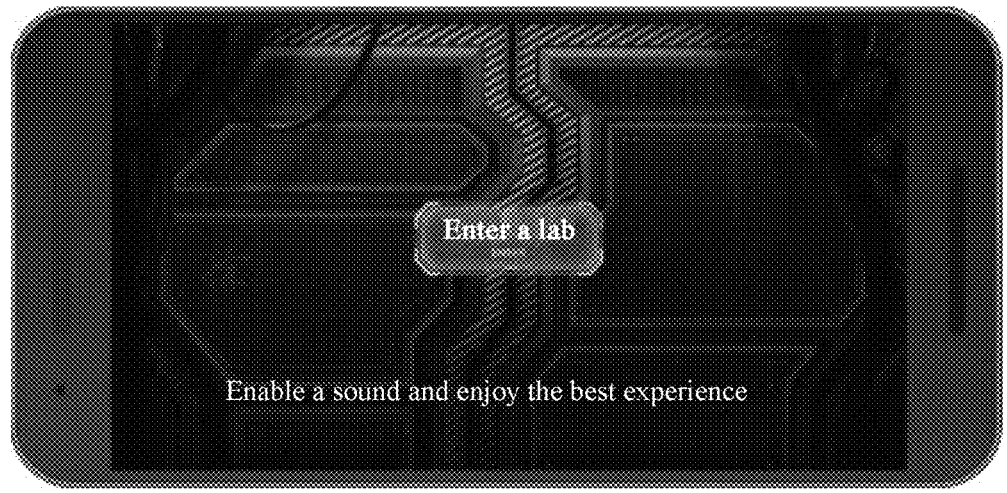
FIG. 5 is a schematic diagram of a virtual scene enabling interface according to an embodiment of this application.

For example, the user clicks the key "enter a lab" in the enabling interface shown in FIG. 5, the terminal device 110 receives the enter instruction for entering the virtual scene and jumps to playing of an initial-location video clip according to the initial-location video clip indicated by the enter instruction. Playing of the initial-location video clip may simulate a video shot when a playing lens is located at the initial location. In a process of playing the initial-location video clip, a movement trigger instruction for triggering, by the user, a lens movement simulation function may be waited to be received. A movement control key may be disposed in an upper layer of a display interface of the initial-location video clip. When the user clicks the movement control key, the terminal device 110 may receive the movement trigger instruction for triggering the lens movement simulation function.

It should be noted that a virtual scene of a game usually includes scenes of a plurality of areas, and back-forth switching between the scenes of the plurality of areas can be implemented. For example, the simulated lens moves from an area 1 to an area 2 and moves from the area 2 back to the area 1. For example, the initial location may means that the simulated lens is located in the area 1. The terminal device receives the enter instruction, and the enter instruction indicates a video clip corresponding to the area 1, to directly jump to playing of the video clip corresponding to the area 1, to simulate a video shot when the playing lens is located in the area 1.

Step S450: Receive a movement trigger instruction triggering a lens movement simulation function and jump to playing of a movement video clip indicated by the movement trigger instruction, the simulated lens being in a process of moving from the initial location to a target location. That is, the displayed picture is a picture of transformation from the virtual scene corresponding to the initial location to a virtual scene corresponding to the target location.

It should be noted that the movement video clip may be a picture in a process in which the simulated lens moves from the area 1 to the area 2 or may be a picture in a process in which the simulated lens moves from the area 2 to an area 3. That is, the movement video clip is a picture shot in a process in which the simulated lens moves from the initial location to the target location. Pictures of moving between different areas may usually be different, and different movement trigger instructions may correspond to different movement video clips.

A picture in which the simulated lens is located in the area 1, a picture in which the simulated lens moves from the area 1 to the area 2, and a picture in which the simulated lens is located in the area 2 may be pre-compressed into a video, and video start-end times at which the simulated lens is located at the area 1, video start-end times at which the simulated lens moves from the area 1 to the area 2, and video start-end times at which the simulated lens is located in the area 2 are respectively recorded.

Specifically, in a process of playing a video clip (that is, the initial-location video clip) in which the simulated lens is located in the area 1, a movement trigger instruction for clicking, by the user, the upper-layer movement control key of a video display interface is waited to be received. After receiving the movement trigger instruction, the terminal device 110 plays a video clip in a process in which the simulated lens moves from the area 1 to the area 2 according to a video clip (that is, the movement video clip) in which the simulated lens moves from the area 1 to the area 2 and that is indicated by the movement trigger instruction. The movement video clip is played, to present a visual effect that the lens slowly moves from the area 1 to the area 2.

Step S470: Jump to playing of a target-location video clip indicated by the movement trigger instruction when playing of the movement video clip ends, the simulated lens being at the target location. That is, the displayed picture is a picture from the virtual scene corresponding to the target location.

It should be noted that when playing of the movement video clip ends, it may be considered that the lens moves from the area 1 to the area 2. In this case, the lens shoots a picture in the area 2. Therefore, when playing of the movement video clip ends, playing of the video clip corresponding to the area 2 may be directly jumped to according to the movement trigger instruction. The prestored video clip corresponding to the area 2 is played, to simulate the video shot when the lens is located in the area 2.

Using the application scene shown in FIG. 2 as an example, assuming that the terminal device 110 is a smartphone, in the existing technology, the smartphone simulates movement of the lens by controlling simultaneous movement of a plurality of material components of a plurality of layers in a canvas. Placement of the material components requires a plurality of tests and is difficult to modify and maintain, and movement of a large quantity of material components consumes performance of the smartphone and may cause picture stutter when inappropriately processed.

In this embodiment of this application, by playing the video clip, before and after lens movement is simulated and in a process of simulating lens movement, different video clips are played, to present a visual effect of lens movement. A whole virtual scene is produced into a video, reducing performance consumption of the smartphone and avoiding picture stutter.

Figure 6:
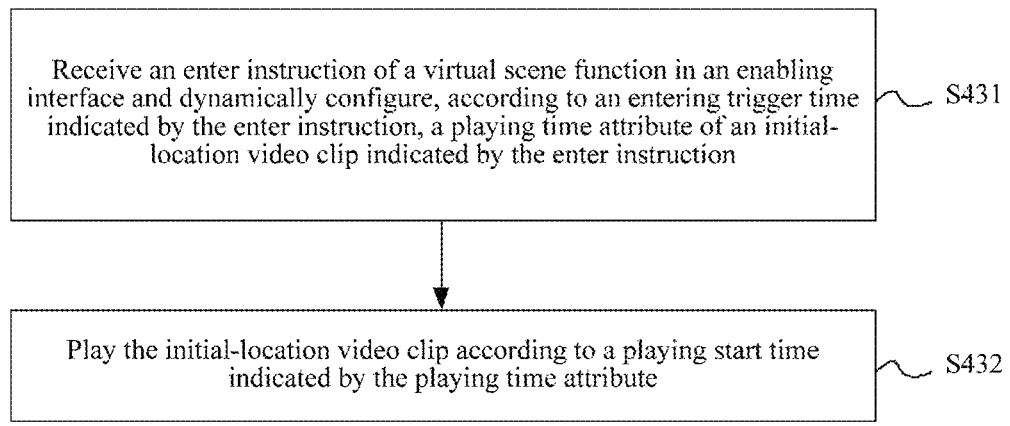
FIG. 6 is a flowchart of an implementation method of step S430 in FIG. 4B according to an embodiment of this application.

FIG. 6 is a schematic flowchart of details of step S430 in an embodiment corresponding to FIG. 4B. As shown in FIG. 6, step S430 specifically includes:

Step S431: Receive an enter instruction of a virtual scene function in an enabling interface and dynamically configure, according to an entering trigger time indicated by the enter instruction, a playing time attribute of an initial-location video clip indicated by the enter instruction.

Specifically, the terminal device 110 may play a video through a video element of an HTML5 document. The Video element includes an annotation method of a video. A specified playing location in the video may be set and returned by setting a currentTime (current time) attribute of the Video element. After receiving the enter instruction of the virtual scene function, the terminal device calls a program script to dynamically configure a playing time attribute of the initial-location video clip indicated by the enter instruction, that is, the currentTime attribute of the initial-location video clip. The program script may be called according to an entering trigger time indicated by the enter instruction to set the currentTime attribute of the initial-location video clip as the indicated entering trigger time.

Step S432: Play the initial-location video clip according to a playing start time indicated by the playing time attribute.

After the playing time attribute of the initial-location video clip is configured, the initial-location video clip may be played on time according to the playing start time included in the playing time attribute. Similarly, to jump to playing of the movement video clip, after the movement trigger instruction is received, the program script is called according to a time indicated by the movement trigger instruction to configure the playing time attribute of the movement video clip. To jump to playing of the target-location video clip, the playing time attribute of the target-location video clip is configured according to a playing end time of the movement video clip, so that the target-location video clip starts being played when playing of the movement video clip ends.

It should be noted that in the existing technology, a currentTime attribute of each frame of image in the video is configured through the program script, and the currentTime attribute of each frame of image progressively decreases, to simulate lens movement, as shown in FIG. 7-1, FIG. 7-2, and FIG. 7-3. In this manner, the currentTime attribute of the image is modified for each frame of the video through the program script, causing unsmoothness of running on a mobile phone device having poor performance and picture stutter in addition to causing no sound during video playing. In this embodiment of this application, when a trigger instruction is received, when a currentTime attribute of a video clip indicated by the trigger instruction is modified, playing of the corresponding video clip is directly jumped to without modifying the currentTime attribute of each frame of image in the video. Therefore, a viewing effect of simulating lens movement can be achieved, and a sound of the video does not disappear.

Figure 8:
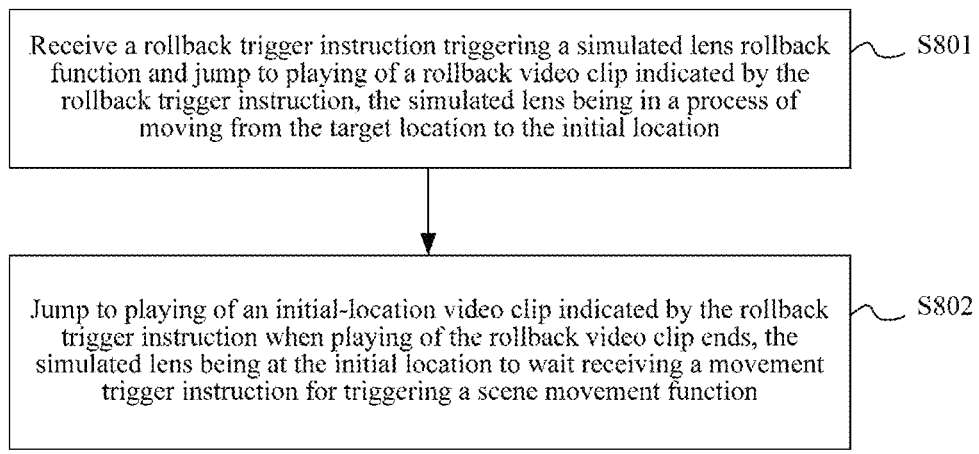
FIG. 8 is a flowchart of a virtual scene display method based on the embodiment in FIG. 4B.

Further, as shown in FIG. 8, after playing of the target-location video clip indicated by the movement trigger instruction is jumped to in step S470, the virtual scene display method for simulating lens movement provided in this embodiment of this application further includes the following steps:

Step S801: Receive a rollback trigger instruction triggering a simulated lens rollback function and jump to playing of a rollback video clip indicated by the rollback trigger instruction, the simulated lens being in a process of moving from the target location to the initial location.

Specifically, a control key for triggering a simulated lens rollback function may be superimposed on an upper layer of the display interface of the target-location video clip. When the user clicks the control key, the terminal device receives a rollback trigger instruction for triggering the simulated lens rollback function and then jumps to playing of a rollback video clip specified by the rollback trigger instruction. The rollback video clip is played, to present a visual effect that the simulated lens moves from the target location to the initial location.

The movement video clip and the rollback video clip are mutually reversely played. That is, a first frame of the movement video clip is a last frame of the rollback video clip, and a first frame of the rollback video clip is a last frame of the movement video clip. A manner of jumping to playing of the rollback video clip may be modifying the currentTime attribute of the rollback video clip by calling the program script.

Step S802: Jump to playing of an initial-location video clip indicated by the rollback trigger instruction when playing of the rollback video clip ends, the simulated lens being at the initial location to wait receiving a movement trigger instruction for triggering a scene movement function.

When playing of the rollback video clip ends, it may be considered that the lens has returned from the target location to the initial location. Therefore, jumping back to playing of the initial-location video clip may simulate a visual effect when the lens is at the initial location. In a process of playing the initial-location video clip, a movement trigger instruction for triggering simulated scene movement function may be waited to be received. Step S450 to step S470 continue to be performed.

Further, after playing of the target-location video clip indicated by the movement trigger instruction is jumped to in step S470, the virtual scene display method for simulating lens movement provided in this embodiment of this application further includes:

determining whether there is a next-location video clip, and repeatedly playing the target-location video clip to wait receiving a trigger instruction for triggering the simulated lens to move to a next location if there is the next-location video clip.

It should be noted that in a process of displaying the target-location video clip, the terminal device 110 determines whether there is a next-location video clip, in other words, whether the lens needs to be simulated to move to a next location. For example, after the simulated lens moves from the area 1 (the initial location) to the area 2 (the target location), it is determined whether there is a video clip in the area 3 (the next location). If there is a video clip in the area 3, the video clip corresponding to the area 2 is repeatedly played to wait receiving a trigger instruction for triggering the simulated lens to move to the area 3, and also wait receiving a trigger instruction for triggering the simulated lens to roll back to the area 1. If the trigger instruction for moving to the area 3 is received, playing of the movement video clip between the area 2 and the area 3 is jumped to, and then a video clip of the area 3 is played. If the trigger instruction for rolling back the area 1 is received, the video clip of the display area 1 may be jumped back to by performing step S801 to step S802.

Optionally, the determining whether there is a next-location video clip specifically includes:

determining, according to a preset serial number sequence of different video clips and a serial number of the target-location video clip, whether there is a video clip with a next serial number.

Video clips of different areas may be numbered in advance according to movement of scenes, for example, numbered from 1, 2, 3, 4, to N, to respectively represent a video clip of an area numbered 1, a video clip of an area numbered 2, and so on. Assuming that the video clip of the area numbered 2 is the target-location video clip, it may be determined according to a serial number sequence, whether there is a video clip of an area numbered 3. If there is a video clip of an area numbered 3, the video clip is considered as a video clip at a next location. A trigger instruction for triggering the simulated lens to move to the area numbered 3 is waited to be received, and a trigger instruction for triggering the simulated lens to move back to the area numbered 2 may be also waited to be received according to requirements.

Figure 9:
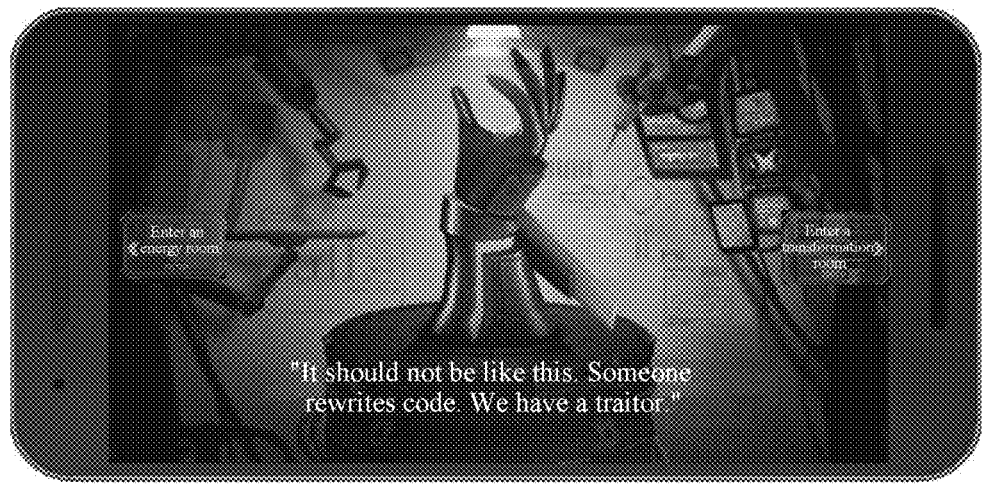
FIG. 9 is a schematic diagram of a display interface of a target-location video clip according to an embodiment of this application.

For example, a form of the display interface of the target-location video clip is shown in FIG. 9. When there if a next-location video clip, a scene left movement control key (such as a key "enter an energy room" in FIG. 9) and a scene right movement control key (such as a key "enter a transformation room" in FIG. 9) may be superimposed on an upper layer of the display interface of the target-location video clip. In a process in which the target-location video clip is repeatedly played, a trigger instruction for triggering the scene left movement control key and a trigger instruction for triggering the scene right movement control key may be waited to be received. The trigger instruction for triggering the simulated lens to move to a next location may be the trigger instruction for triggering the scene right movement control key, and a rollback trigger instruction may be the trigger instruction for triggering the scene left movement control key.

Figure 10:
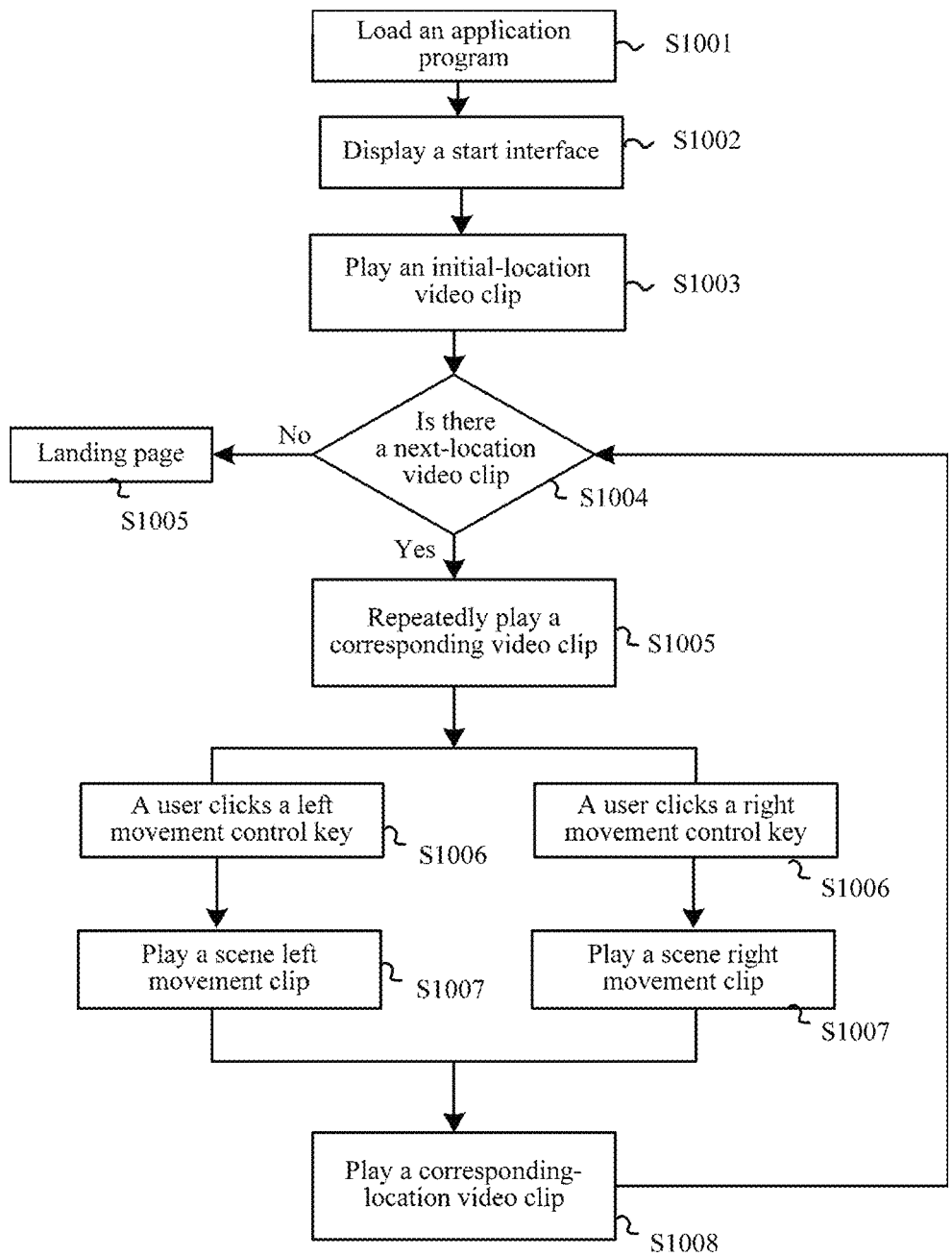
FIG. 10 is a detailed flowchart of a virtual scene display method according to an embodiment of this application.

As shown in FIG. 10, a detailed process of a virtual scene display method for simulating lens movement provided in an exemplary embodiment is as follows:

Step S1001: Receive an application program displayed by triggering loading a virtual scene by a user.

Step S1002: Display a start interface (referring to FIG. 5).

Step S1003: A user clicks a key "enter a lab", and a terminal device plays an initial-location video clip after receiving a trigger instruction for triggering, by the user, a virtual scene entering function of the start interface.

Step S1004: Determine whether there is a next-location video clip.

Step S1005: Repeatedly play a corresponding video clip if there is a next-location video clip. Display a landing page after playing of the initial-location video clip ends if there is no next-location video clip.

Step S1006: In a process of repeating the initial-location video clip, receive a trigger instruction for triggering a scene right movement control key when the user clicks a right movement control key. Receive a trigger instruction for triggering a scene left movement control key when the user clicks a left movement control key.

Figure 11:
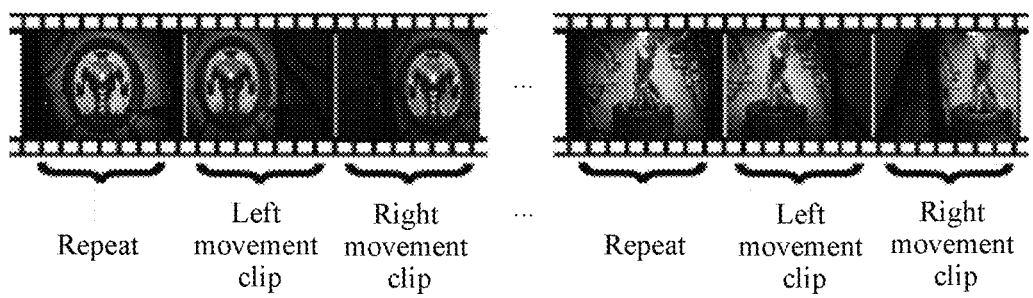
FIG. 11 is a schematic diagram of segmenting video clips at different locations according to a scene movement requirement according to an embodiment of this application.

Step S1007: Play a scene right movement clip when the user clicks the right movement control key, or play a scene left movement clip when the user clicks the left movement control key. As shown in FIG. 11, in the virtual scene, video clips at different locations are segmented, a video clip at a specified location may be repeatedly played, and a specified left movement video clip may be played when the user clicks a left movement key, and a specified right movement video clip may be played when the user clicks a right movement key.

Step S1008: Display a corresponding-location video clip after scene right movement or left movement when playing of the scene right movement clip or the left movement clip ends.

Whether there is a next-location video clip continues to be determined. If there if a next-location video clip, the corresponding-location video clip in step S1008 is repeatedly played. The user is waited to trigger the left movement control key or the right movement control key.

In conclusion, in the technical solution provided in this embodiment of this application, the lens may be simulated to move in the virtual scene, to make an animation scene present a visual effect of playing backward. By playing the video clip in segments, simulation of lens movement does not lose an original sound of a video while ensuring a high-quality picture. The technology has a low performance requirement for an intelligent device such as a mobile phone. When a network condition is ideal, picture stutter is not caused, bringing the user best visual experience of lens movement, page turning, scrolling, and reverse playing.

The following is an apparatus embodiment of this application, which may be configured to perform the embodiment of the virtual scene display method for simulating lens movement performed by the terminal device 110 in the embodiments of this application. For details not disclosed in the apparatus embodiment of the embodiments of this application, refer to the embodiment of the virtual scene display method for simulating lens movement in the embodiments of this application.

Figure 12:
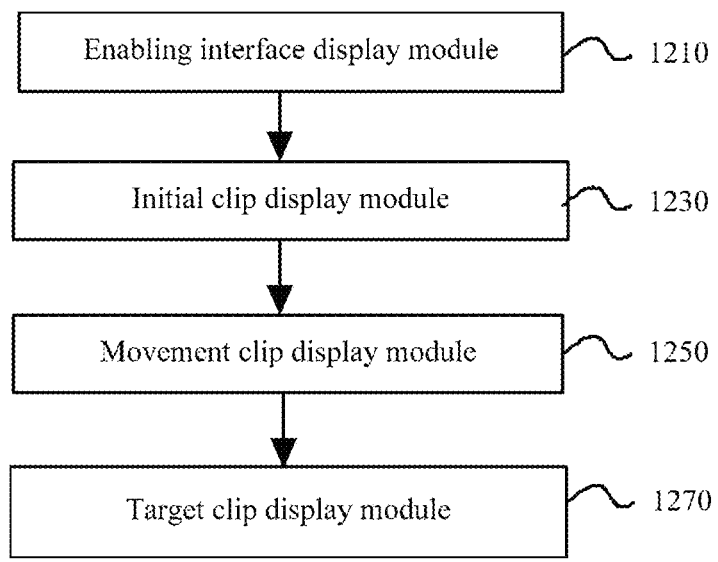
FIG. 12 is a block diagram of a virtual scene display apparatus according to an embodiment of this application.

FIG. 12 is a block diagram of a virtual scene display apparatus for simulating lens movement shown according to an exemplary embodiment. The virtual scene display apparatus for simulating lens movement may be used in a terminal device 110 in an implementation environment shown in FIG. 2, and perform all or some of steps of a virtual scene display method for simulating lens movement shown in any one of FIG. 4B, FIG. 6, FIG. 8, and FIG. 10. As shown in FIG. 12, the apparatus includes but not limited to: an enabling interface display module 1210, an initial clip display module 1230, a movement clip display module 1250, and a target clip display module 1270.

The enabling interface display module 1210 is configured to receive a trigger instruction for enabling display of a virtual scene and display a virtual scene enabling interface.

The initial clip display module 1230 is configured to receive an enter instruction of a virtual scene function in the enabling interface and play an initial-location video clip indicated by the enter instruction, a simulated lens being located at an initial location.

The movement clip display module 1250 is configured to receive a movement trigger instruction triggering a lens movement simulation function and jump to playing of a movement video clip indicated by the movement trigger instruction, the simulated lens being in a process of moving from the initial location to a target location.

The target clip display module 1270 is configured to jump to playing of a target-location video clip indicated by the movement trigger instruction when playing of the movement video clip ends, the simulated lens being at the target location.

For details of implementation processes of functions and actions of modules in the foregoing apparatus, refer to the foregoing implementation processes of corresponding steps in the virtual scene display method for simulating lens movement. Details are not described herein again.

The enabling interface display module 1210 is, for example, a physical structure multimedia component 208 in FIG. 3.

The initial clip display module 1230, the movement clip display module 1250, and the target clip display module 1270 may also be functional modules, configured to perform corresponding steps in the virtual scene display method for simulating lens movement. It may be understood that these modules may be implemented through hardware, software, or a combination thereof. When implemented through hardware, these modules may be implemented as one or more hardware modules, for example, one or more application specific integrated circuits. When implemented through software, these modules may be implemented as one or more computer programs executed on one or more processors, for example, a program executed by the processor 218 of FIG. 3 and stored in the memory 204.

Figure 13:
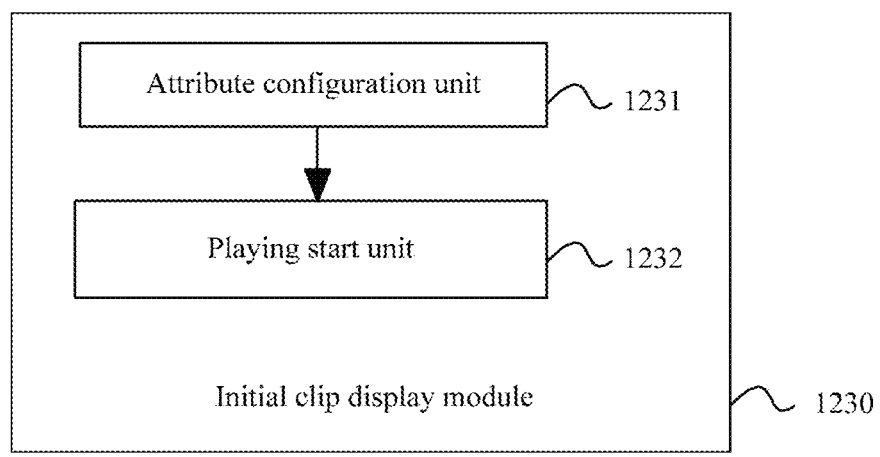
FIG. 13 is a block diagram of an initial clip display module in the embodiment of FIG. 12.

FIG. 13 is a detailed block diagram of an initial clip display module 1230 in an embodiment corresponding to FIG. 12. As shown in FIG. 13, the initial clip display module 1230 may include but not limited to:

an attribute configuration unit 1231, configured to receive an enter instruction of a virtual scene function in an enabling interface and dynamically configure, according to an entering trigger time indicated by the enter instruction, a playing time attribute of an initial-location video clip indicated by the enter instruction; and a playing enabling unit 1232, configured to play the initial-location video clip according to a playing start time indicated by the playing time attribute.

Further, based on the foregoing embodiments, the virtual scene display apparatus for simulating lens movement may further include but not limited to:

a rollback clip display module, configured to receive a rollback trigger instruction triggering a simulated lens rollback function and jump to playing of a rollback video clip indicated by the rollback trigger instruction, the simulated lens being in a process of moving from the target location to the initial location; and a rollback initial display module, configured to jump to playing of an initial-location video clip indicated by the rollback trigger instruction when playing of the rollback video clip ends, the simulated lens being at the initial location to wait receiving a movement trigger instruction for triggering a scene movement function.

Further, based on the foregoing embodiments, the virtual scene display apparatus for simulating lens movement may further include but not limited to:

a video clip determining module, configured to determine whether there is a next-location video clip, and repeatedly play the target-location video clip to wait receiving a trigger instruction for triggering the simulated lens to move to a next location if there is the next-location video clip.

Further, based on the foregoing embodiments, the video clip determining module includes:

a serial number determining unit, configured to determine, according to a preset serial number sequence of different video clips and a serial number of the target-location video clip, whether there is a video clip with a next serial number.

Optionally, an embodiment of this application further provides an electronic device. The electronic device may be used in the terminal device 110 in the implementation environment shown in FIG. 2 and perform all or some of steps of the virtual scene display method for simulating lens movement shown in any one of FIG. 4B, FIG. 6, FIG. 8, and FIG. 10. The electronic device includes:

a processor;

a memory that is configured to store an instruction executable by a processor, the processor being configured to perform the virtual scene display method for simulating lens movement in the foregoing embodiments.

Specific manners for the processor in the apparatus to perform operations in this embodiment have been described in detail in embodiments related to the virtual scene display method for simulating lens movement and are not described in detail herein.

In an exemplary embodiment, a storage medium is further provided. The storage medium is a computer-readable storage medium. For example, the storage medium may be a transitory or non-transitory computer-readable storage medium including instructions. The storage medium stores a computer program. The computer program may be executed by the processor 218 to perform the virtual scene display method for simulating lens movement in the foregoing embodiments.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A virtual scene display method performed by a computing device, the method comprising:

obtaining animation data and video data, the animation data including data used for rendering an animation effect and data used for describing an animation element of a plurality of animation elements and a motion logic, the video data including multiple pre-generated video clips, each video clip representing a change of angle of view of scenes in a game;

displaying an animation interface corresponding to the animation data in an animation display area of a display interface, the animation interface comprising a first virtual scene of the game and the first virtual scene comprising the plurality of animation elements, each animation element being associated with one of the video clips and the video clips having different video contents all starting from the first virtual scene of the game currently displayed in the animation interface;

detecting a user selection of one of the plurality of animation elements, the user selection triggering a lens movement simulation function associated with a corresponding change of angle of view of scenes in the game and an associated start time; and playing a video clip in the video data associated with the user-selected animation element in response to the user selection at a starting position in the video data based on the start time associated with the user selection wherein at the start time corresponds to a simulated lens being located in a first area, and a video end time corresponds to the simulated lens being located in a second area, the video clip presenting a picture of transformation from the first virtual scene corresponding to a first angle of view of the game to a second virtual scene corresponding to a second virtual scene of the game.

2. The method according to claim 1, wherein the animation display area is provided by a Canvas element of HTML5, and the video element is a Video element of HTML5.

3. The method according to claim 1, wherein the method further comprises:

playing a second video clip corresponding to the second virtual scene in the video data and displaying an interactive element in a display area of the second video clip in a superimposing manner; and playing a third video clip corresponding to the interactive display element in the video data in response to an operation on the interactive element.

4. The method according to claim 3, further comprising:

playing the second video clip again and displaying the interactive element in a superimposing manner when playing of the second video clip is completed in response to that it is determined that the operation on the interactive element is not detected.

5. A computing device comprising one or more processors, memory coupled to the one or more processors and a plurality of programs stored in the memory that, when executed by the one or more processors, cause the computing device to perform a plurality of operations comprising:
obtaining animation data and video data, the animation data including data used for rendering an animation effect and data used for describing an animation element of a plurality of animation elements and a motion logic, the video data including multiple pre-generated video clips, each video clip representing a change of angle of view of scenes in a game;
displaying an animation interface corresponding to the animation data in an animation display area of a display interface, the animation interface comprising a first virtual scene of the game and the first virtual scene comprising the plurality of animation elements, each animation element being associated with one of the video clips and the video clips having different video contents all starting from the first virtual scene of the game currently displayed in the animation interface;
detecting a user selection of one of the plurality of animation elements, the user selection triggering a lens movement simulation function associated with a corresponding change of angle of view of scenes in the game and an associated start time; and
playing a video clip in the video data associated with the user-selected animation element in response to the user selection at a starting position in the video data based on the start time associated with the user selection wherein at the start time corresponds to a simulated lens being located in a first area, and a video end time corresponds to the simulated lens being located in a second area, the video clip presenting a picture of transformation from the first virtual scene corresponding to a first angle of view of the game to a second virtual scene corresponding to a second virtual scene of the game.

6. The computing device according to claim 5, wherein the animation display area is provided by a Canvas element of HTML5, and the video element is a Video element of HTML5.

7. The computing device according to claim 5, wherein the plurality of operations further comprise:
playing a second video clip corresponding to the second virtual scene in the video data and displaying an interactive element in a display area of the second video clip in a superimposing manner; and
playing a third video clip corresponding to the interactive display element in the video data in response to an operation on the interactive element.

8. The computing device according to claim 7, wherein the plurality of operations further comprise:
playing the second video clip again and displaying the interactive element in a superimposing manner when playing of the second video clip is completed in response to that it is determined that the operation on the interactive element is not detected.

9. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
obtaining animation data and video data, the animation data including data used for rendering an animation effect and data used for describing an animation element of a plurality of animation elements and a motion logic, the video data including multiple pre-generated video clips, each video clip representing a change of angle of view of scenes in a game;
displaying an animation interface corresponding to the animation data in an animation display area of a display interface, the animation interface comprising a first virtual scene of the game and the first virtual scene comprising the plurality of animation elements, each animation element being associated with one of the video clips and the video clips having different video contents all starting from the first virtual scene of the game currently displayed in the animation interface;
detecting a user selection of one of the plurality of animation elements, the user selection triggering a lens movement simulation function associated with a corresponding change of angle of view of scenes in the game and an associated start time; and
playing a video clip in the video data associated with the user-selected animation element in response to the user selection at a starting position in the video data based on the start time associated with the user selection wherein at the start time corresponds to a simulated lens being located in a first area, and a video end corresponds to the simulated lens being located in a second area, the video clip presenting a picture of transformation from the first virtual scene corresponding to a first angle of view of the game to a second virtual scene corresponding to a second virtual scene of the game.

10. The non-transitory computer readable storage medium according to claim 9, wherein the animation display area is provided by a Canvas element of HTML5, and the video element is a Video element of HTML5.

11. The non-transitory computer readable storage medium according to claim 9, wherein the video data comprises a plurality of video clips; and the plurality of operations further comprise:
playing a second video clip corresponding to the second virtual scene in the video data and displaying an interactive element in a display area of the second video clip in a superimposing manner; and
playing a third video clip corresponding to the interactive display element in the video data in response to an operation on the interactive element.

12. The non-transitory computer readable storage medium according to claim 11, wherein the plurality of operations further comprise:
playing the second video clip again and displaying the interactive element in a superimposing manner when playing of the second video clip is completed in response to that it is determined that the operation on the interactive element is not detected.

* * * * *